Aug. 19, 1930.                    W. A. SCHMIDT                    1,773,279
                 METHOD AND APPARATUS FOR FLUID PRESSURE REGULATION
                            Filed April 15, 1925       2 Sheets-Sheet 1
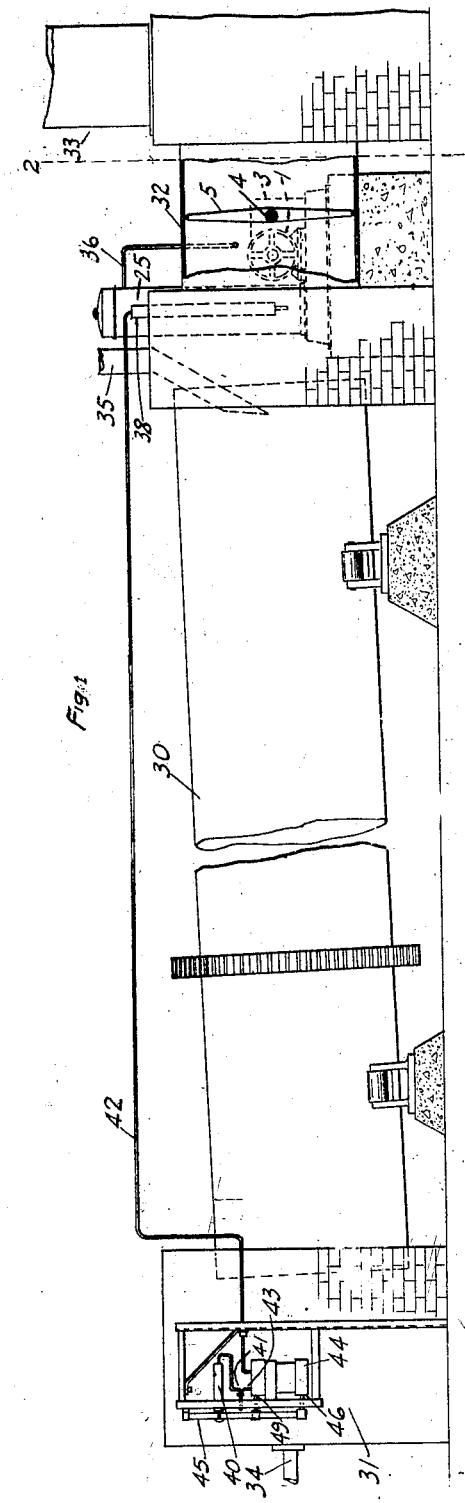
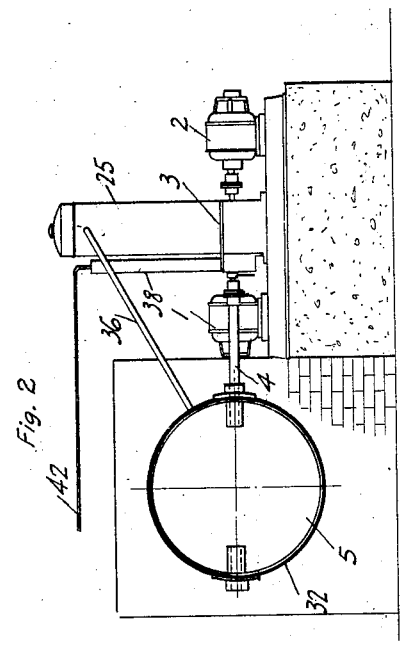
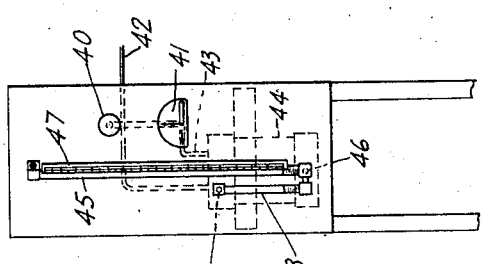
INVENTOR
Walter A. Schmidt
BY Arthur P. Knight
ATTORNEY

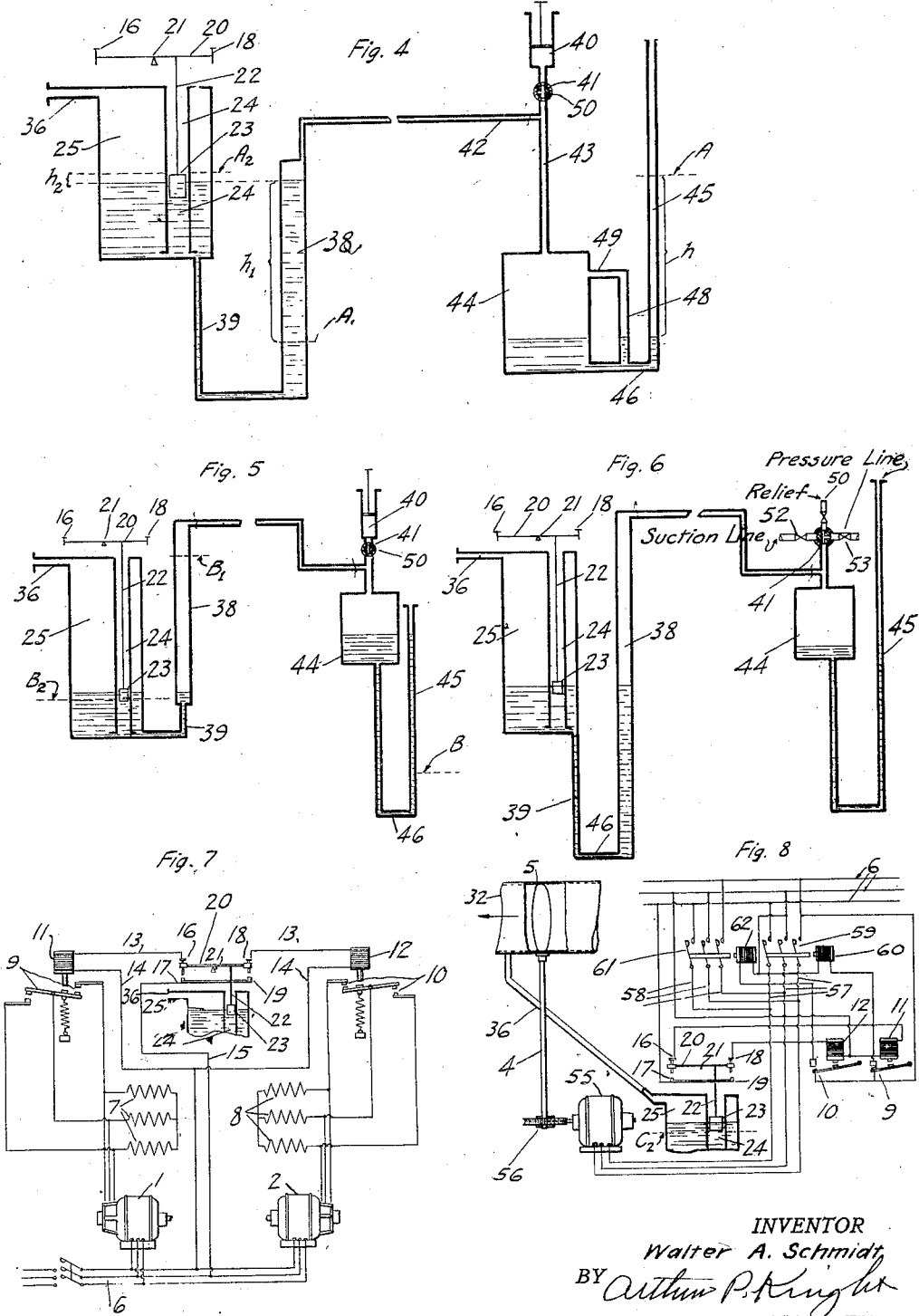

Patented Aug. 19, 1930

1,773,279

UNITED STATES PATENT OFFICE

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

METHOD AND APPARATUS FOR FLUID-PRESSURE REGULATION

Application filed April 15, 1925. Serial No. 23,308.

This invention relates to apparatus for maintaining a desired pressure at any point in the path of a moving fluid and especially for maintaining a desired gas pressure in a flue, passage, or chamber through which a gas is flowing. The word pressure as used throughout this specification is understood to include both sub-atmospheric pressure, or vacuum, and super-atmospheric pressure, and my invention is adapted to maintain either a constant vacuum (suction or draft) or a constant super-atmospheric pressure at a given point in a fluid stream. Since the ordinary pressure gage indicates the pressure in excess of atmospheric and such pressures are commonly designated as gage pressures I will, for the sake of simplicity in the following specification, use the term vacuum to denote sub-atmospheric pressure, and the term gage pressure to denote super-atmospheric pressure wherever it is desirable to distinguish between the two.

An important object of this invention is to provide an apparatus whereby any desired constant fluid pressure may be maintained, and to also provide simple and novel means for adjusting such constant pressure to any desired value. A further object of the invention is to provide for control of the fluid pressure by an operator stationed at a point remote from the point at which the desired pressure is to be maintained, and also remote from the point at which the regulating means acts on the fluid stream. A further object of the invention is to provide means, in connection with an apparatus of this type, whereby an indication of the existing fluid pressure at the desired point of regulation may be given adjacent the point of remote control, and whereby through only a slight modification in the apparatus any desired scale of magnification of such pressure indication may be provided for. A further object of the invention is to provide for controlling or adjusting the pressure regulation while the regulator is in effective operation and without any necessity of momentarily suspending the regulation to permit such adjustment.

My invention may be used in connection with any fluid pressure regulator which is or may be adapted to be controlled through a float mechanism, and since any type of electrically operated regulator may be readily controlled by suitable electrical contact means adapted to be operated by float mechanism it will be seen that this invention is therefore well adapted for use with any electrically operated regulator. One type of fluid pressure regulator with which my control means is particularly well adapted for use is that described in U. S. patent to J. H. Reineke, No. 1,480,837, issued January 15, 1924. I will therefore first illustrate and describe my invention in connection with this type of regulator, and will refer to said patent for a description of the detailed operation of such regulator. My invention may also be used with other types of electrically operated regulators, however, as will be described hereinafter. Furthermore the invention is not limited to use with electrically operated regulators, but may also be used with many types of mechanically operated regulators.

The accompanying drawings illustrate embodiments of my invention and referring thereto:

Fig. 1 is a side elevation of a cement kiln provided with my improved means for regulating the draft therein by remote control, using a regulator of the type described in said patent to J. H. Reineke.

Fig. 2 is a transverse section on line 2—2 in Fig. 1.

Fig. 3 is a front view of the means for remote control and indication in the form of the invention shown in Fig. 1.

Fig. 4 is a diagrammatic vertical section of the control means and float mechanism in the form of the invention shown in Figs. 1 to 3, and therefore adapted to control the regulation of a vacuum.

Fig. 5 is a diagrammatic section similar to Fig. 4, of a control means adapted to control the regulation of super-atmospheric or gage pressure.

Fig. 6 is a similar view of a control means adapted to the regulation of either vacuum or gage pressure.

Fig. 7 is a diagram of the electrical connections for controlling the regulator motors by operation of the float mechanism.

Fig. 8 is a diagram of the electrical connections for controlling the operation of a single motor regulator by means of float-controlled contact mechanism.

In order that my invention may be more fully understood I will first describe the general principles of the construction and operation of the regulator described in the aforesaid patent to J. H. Reineke. Said regulator comprises two electric motors 1 and 2 adapted to operate through suitable differential gear means in gear box 3, said gear means being in turn connected to drive the shaft 4 of a damper or other flow-controlling or throttling device 5. The arrangement of said differential gear means is such that when the motors 1 and 2 are running at equal speed, said shaft 4 is stationary and the damper therefore remains unaffected, but upon an increase in speed of one of said motors, shaft 4 is caused to rotate in one direction, and upon an increase in speed of the other motor the shaft is caused to rotate in the other direction. In the present instance the gearing is so arranged that an increase in the speed of motor 1 will cause shaft 4 to rotate in such direction as to open damper 5 and an increase in the speed of motor 2 will cause said damper to move toward closed position. Said motors are connected by wiring indicated at 6 to a suitable source of electric current and any suitable means may be employed for controlling the speed of said motors by the operation of a float mechanism. For example motors 1 and 2 may be induction motors whose rotor windings are provided with resistances 7 and 8 respectively, said resistances being normally included in said field windings but being adapted to be short circuited therefrom so as to increase the speed of the corresponding motors. The means for accomplishing such short circuiting of the resistance means may comprise contact means 9 and 10 adapted to be controlled by corresponding electromagnets 11 and 12. Said electro-magnets are included in electric circuits comprising wires 13, 14, and 15, and including contact means 16, 17, and 18, 19 in the circuits for the respective electro-magnets 11 and 12. The contact members 16 and 18 are mounted on arm 20 pivoted at 21, said arm being pivotally connected to the upper end of rod 22. Said rod is provided at its lower end with a float 23 adapted to be raised and lowered in response to the raising and lowering of suitable liquid such as oil in the float chamber 24. Float chamber 24 opens at its lower end into the lower portion of pressure chamber 25. The level of the liquid in chamber 24 is therefore in turn dependent upon the pressure on the surface of the liquid in the pressure chamber 25, said pressure being equal to the fluid pressure at the point of regulation as hereinafter described.

It will be seen that an increase in pressure in chamber 25 will cause float 23 to be raised which will in turn move arm 20 in such manner as to close connection between contact members 16 and 17. Electro-magnet 11 is thereby energized causing a connection to be closed at contact means 9 controlled by said electro-magnets. The resistance 7 in the field winding of motor 1 is thereby short circuited and the speed of said motor consequently increased, causing the damper to move toward open position. On the other hand a decrease in pressure in chamber 25 will cause the float member 23 to be lowered, which will in turn operate in a similar manner to cause the speed of motor 2 to increase and thereby move the damper toward closed position. In Figs. 1 to 3 I have shown a regulator according to my invention as applied to the regulation of the draft in a rotary kiln 30 for the burning of Portland cement or for other purposes. Said kiln is mounted in the usual manner of such apparatus and is provided at its lower end with a hood or burner chamber 31 and is connected at its upper end through flue 32 to the stack 33. Suitable fuel supply means indicated at 34 and suitable means such as a chute indicated at 35 for supplying the material to be burned to the upper end of the kiln are provided. For satisfactory operation of such a kiln it is highly desirable to maintain uniform conditions of combustion and consequently of great importance to maintain a uniform draft in the kiln. The fluid pressure regulator according to my invention is therefore adapted to maintain a certain desired vacuum or suction in the flue 32 and thereby determine the volume of air drawn through the kiln.

For this purpose the damper 5 is located in said flue 32 and the pressure chamber 25 is connected by pipe 36 to a suitable point in the flue for example just in front of said damper. The condition of pressure within pressure chamber 25 is therefore at any time the same as that in flue 32, such pressure being in the present case a vacuum during operation. The vacuum which is to be maintained in said flue is determined by the difference in level between the liquid in pressure chamber 25 and the float chamber 24 when the float is in equilibrium position, and according to my invention this difference in level may be varied by varying the total amount of liquid in said two chambers. For this purpose I prefer to provide an auxiliary liquid storage tank or chamber 38 communicating through a passage such as pipe 39 with the lower portion of pressure chamber 25 and hence also with the float chamber 24. In Fig. 4 the fluid levels in the various parts of the apparatus are shown in inoperative position, the apparatus being adapted with the levels as there shown to maintain only atmospheric pressure in flue 32. In order to maintain the desired suction in said flue means are provided for causing more or less of the liquid from tank 38 to flow into the pressure chamber 25. This may be accomplished for example by applying air pressure or other fluid pressure to the surface of the liquid in tank 38, such pressure being applied for example by means of a hand pump 40. Said hand pump is connected through three-way valve 41 and pipes 42 and 43 respectively to the tank 38 and to an indicator storage tank 44 connected to indicating means 45. Valve 41 is adapted to place tanks 38 and 44 in communication with hand-pump 40 or with the outer air through release opening 50. Indicating means 45 may comprise a gage glass or tube of suitable height open at its upper end and connected at its lower end through pipe 46 to tank 44 and said tank and gage glass may be provided with a suitable indicating liquid such as gage oil. As shown in Fig. 3 suitable measuring means such as scale 47 may be provided adjacent said gage glass 45 and adapted to measure the height of the liquid in said glass. A zero-indicating glass tube 48 may also be provided, connected at its lower end to reservoir 44 and to gage glass 45 and communicating with the interior of reservoir 44 through pipe 49 at its upper end. Said tube is therefore adapted to indicate the level of the liquid in reservoir 44 so as to provide for proper adjustment of the zero point of scale 47. Said scale 47 may be graduated to read directly in inches of liquid column in gage glass 45 but it is preferably graduated or calibrated so as to indicate the corresponding vacuum in pressure chamber 25 and hence in flue 32 as hereinafter described. It will be seen that the actual height of the liquid in gage glass 45 will represent the gas pressure in storage tank 44 and hence also in storage tank 38, and that the ratio between the height of such liquid column and the suction at the point of regulation as measured in a column of the same liquid, is consequently equal to the ratio between the cross-sectional area of pressure chamber 25 and storage tank 38.

The method of draft regulation with the above described form of my invention is as follows, it being assumed that the kiln is in normal operation and that the combustion of fuel therein tends to produce a natural draft through the kiln, the amount of which is to be controlled by operation of damper 5. In order to maintain a certain desired draft it is proposed to maintain a certain vacuum or suction in flue 32 by operation of the regulator. Starting with the liquid levels in the various chambers as shown in Fig. 4, valve 41 is turned so as to place the pump 40 in communication with the storage tanks 38 and 44. Said pump is then operated to create a sufficient pressure in said tanks to raise the liquid column in gage glass 45 to the desired point, for example to the level A in said figure, whereupon valve 41 is turned to closed position. The pressure in tanks 38 and 44 will also cause a lowering of the liquid level in storage tank 38 to a level such as $A_1$, said level being such that the liquid column between the level of the liquid at $A_1$ and the level of the liquid in the float chamber 24 just balances the liquid column in the gage glass. Assuming that the same liquid is used in the float chamber and in the gage glass the height $h_1$ will be equal to the height $h$. Since the equilibrium position of float 23 and therefore the equilibrium level of the liquid in float chamber 24 is maintained substantially constant by the operation of the regulator, the liquid thus displaced from storage tank 38 causes a rise of the level in pressure chamber 25 for example to the level indicated at $A_2$. The position of level $A_2$ is such that the heights $h_1$ and $h_2$ are inversely proportional to the cross-sectional areas of the corresponding chambers 38 and 25. The regulator will then operate to maintain in pressure chamber 25 and hence in flue 32 a vacuum corresponding to a liquid column of height $h_2$. For example with the liquid at this level if the vacuum in flue 32 becomes too great (or in other words the absolute pressure falls below atmospheric pressure by an amount greater than $h_2$) the liquid level will tend to rise in pressure chamber 25 and to fall in float chamber 24. Float 23 will therefore be lowered and will operate as above described to increase the speed of motor 2 and hence move the damper toward closed position until the desired condition of vacuum is restored. Conversely if the vacuum falls below the desired point or the absolute pressure becomes too great, float 23 will be caused to rise and will cause an increase in speed of motor 1 so as to move the damper toward open position. As long as the setting of the controlling means is not changed the regulator will therefore operate to maintain a constant vacuum or suction in flue 32 and hence to maintain a constant draft through the kiln. It will also be observed that by making scale 47 so as to read directly in inches of vacuum in said flue a direct indication is given adjacent the point of remote control showing the vacuum which is being maintained in the flue. Furthermore, it will be seen that by properly proportioning the cross-sectional areas of pressure chamber 25 and storage tank 38 when designing the apparatus, any desired magnification of the indication adjacent the point of remote control may be provided for. In general, however, the storage tank 38 should preferably be of relatively small cross sectional area as compared to pressure chamber 25, especially when the deviation from atmospheric pressure of the pressure to be regulated is itself small, so as to provide for a material magnification in the indications obtained on scale 47.

In case it is desired at any time to vary the draft it is only necessary to manipulate the remote control means so as to raise or lower the liquid column in gage glass 45 to the desired point. For example, if it is desired to increase the vacuum in flue 32, valve 41 is again operated to bring pump 40 in communication with tanks 38 and 44 and the pressure in said tanks is increased sufficiently to give the desired height of liquid column in the gage glass. The level A is thus raised and the regulator will then operate to maintain in flue 32 a condition of vacuum corresponding to a liquid column equal to the increased height $h_2$. If on the other hand it is desired to reduce the vacuum, valve 41 is turned so as to establish communication between tanks 38 and 44 and the release opening 50 so as to reduce the pressure in said tanks sufficiently to lower the liquid level in gage glass 45 to the desired point. The liquid levels in the various parts of the apparatus are thus varied accordingly and the height $h_2$ is decreased so that the regulator will then operate to maintain a less vacuum in the flue. The operator of the kiln may therefore remain at the firing end of the kiln and from this point control the regulation of the draft at the other end of the kiln, a feature which is often of very great advantage.

It will be understood that the above described form of regulator may be used in any place in which it is desired to maintain a desired vacuum in a flue through which gas is passing, whether the passage of such gas be due to natural draft as above described or to artificial draft such as produced by a fan or blower. My invention may also be adapted, with slight modifications in the apparatus, to maintain a constant gage pressure or superatmospheric pressure at any desired point in a flue through which a gas is passing. A type of control means for this purpose is shown diagrammatically in Fig. 5, the various parts thereof being numbered and lettered as in Fig. 4. In this case it is desired to maintain a constant gage pressure at some point in a flue which is connected with pressure chamber 25, said flue being provided as before with a damper or other flow-controlling means operated by the regulator in substantially the same manner as above described. For this purpose it is necessary to reduce the pressure in storage tanks 38 and 44 below atmospheric pressure and hand pump 40 should therefore be in this case an exhausting pump rather than a compression pump. The pipe 36 leading from pressure tank 25 is connected to the flue through which the gas is passing at the point at which the desired pressure is to be maintained. The operation in this case is substantially the same as above described it being evident that by suitable manipulation of valve 41 and pump 40 the level of the liquid in gage glass 45 may be lowered to any desired point such as the level indicated at B, thus causing a corresponding rise of the liquid in tank 38 to the level $B_1$ and a corresponding lowering of the level in pressure chamber 25 as indicated at $B_2$. The regulator will then operate to maintain within pressure chamber 25 and at the portion of the flue communicating therewith, a gage pressure equal to a liquid column of a height equal to the difference between the level $B_2$ and the level of the liquid in float chamber 24, and an indication of such pressure at any desired scale of magnification, will be given at the point of control. Furthermore by suitable manipulation of valve 41 and pump 40 such pressure may be increased to any desired point up to the maximum pressure obtainable with the damper in full open position, or by manipulation of valve 41 to admit air through opening 50, such pressure may be reduced.

It may be desirable in some cases to provide a single regulator and control means which is adapted to maintain either pressure or vacuum and an apparatus for this purpose is shown diagrammatically in Fig. 6. In this case also the parts are numbered substantially as before, the three way valve 41 however being adapted to establish communication from tanks 38 and 44 to either a suction or vacuum line 52 or pressure line 53 as well as to release opening 50. The level of the liquid in gage glass 45 may thus by manipulation of valve 41 be brought either above or below the level of the liquid in tank 44 so as to provide for maintaining either a vacuum or a gage pressure in pressure tank 25 and hence at the desired point in the flue connected therewith.

While I have shown the control means, comprising gage glass 45 and its storage tank 44, valve 41 and means for creating a pressure or vacuum in said storage tank and in the tank 38, as located at a point remote from the regulator proper and from the point of regulation in the flue, so as to provide for remote control of the operation of said regulator, and while the advantages of my invention are most fully realized with such an arrangement, the same control means may be located adjacent the regulator where remote control is not desired. In such case the connections and mode of operation are the same as before, the control means providing a simple means for adjusting to any desired value the pressure maintained by the regulator and also providing a direct indication of such pressure on an enlarged scale.

Furthermore, while I have shown my invention as applied only in connection with regulation of gas, it will be readily understood that it may be applied equally well to the regulation of any moving fluid, whether a gas or a liquid, the regulator in any case being adapted to operate a flow-controlling device, such as a damper or valve, located in the path of the fluid stream, and being responsive to variations in the pressure in such fluid stream in such manner as to cause said flow-controlling device to operate to maintain any desired pressure according to the setting of the regulator.

The above-described means for controlling the operation of the regulator is applicable not only in connection with the type of regulator described in said patent to J. H. Reineke, but may be used in connection with many other electrically operated fluid pressure regulators. For example as shown in Fig. 8, the regulator may comprise a single electric motor 55 connected through gearing indicated at 56 to a damper or other flow controlling device 5 in a flue 32, said motor being adapted to rotate in one direction or the other upon establishment of one or the other of two operating circuits 57 and 58. Circuit 57 includes contact means 59 adapted to be closed upon energization of electromagnet 60 due to closing of contact 9 which occurs, as before, upon raising of float 23, and circuit 58 includes similar contact means 61 adapted to be closed by similar electromagnetic means 62 adapted to be energized upon closing of contact means 10 due to lowering of float 23.

The same means of control of the float mechanism is used in this case as in the forms above described and the manner of operation of said control means is substantialy the same. The liquid in pressure chamber 25 may be adjusted, by operation of the control means, to any desired level, such as $C_2$, whereupon motor 55 will be operated to maintain a corresponding pressure in the flue 32. For example, if the pressure increases beyond the desired point, float 23 wil be raised, and operating circuit 57 will be established. When connected as shown in Fig. 8, the apparatus is adapted to maintain a desired gage pressure in flue 32 beyond the damper 5, for example in case a gas is being forced through said flue by a fan or other means, the pipe 36 being in this case connected to said flue beyond the damper 5. The arrangement of the wiring and gearing is therefore such that energization of circuit 57 as above described causes motor 55 to turn said damper toward closed position so as to again reduce the pressure to the desired value. A reduction in pressure on the other hand causes float 23 to fall, thus causing energization of operating circuit 58 which will cause the motor to turn in the reverse direction and open the damper.

It will of course be understood that the last-described form of regulator may also be used for the regulation of a vacuum as well as a gage pressure and may be used for regulating any moving fluid, either gas or liquid.

My improved controlling or adjusting means is not limited to use with electrically operated regulators, but may also be used advantageously with many types of mechanically operated regulators. For example in certain types of regulators, the movement of the damper or flow-controlling means is effected by piston means adapted to be operated in one direction or the other by means of fluid pressure, such as air, steam or water pressure, the admission of such fluid pressure to the piston being controlled by means responsive to changes in pressure at the point of regulation. A regulator of this type, operated by the pressure of a working fluid controlled by pressure-responsive means is shown and described in the patent to A. Steinbart, No. 1,306,446, issued June 10, 1919. My invention may be easily adapted to use with such regulators, since the float mechanism thereof comprises such a means responsive to variations in pressure and may be readily adapted to control the admission of fluid pressure to one side or the other of the damper-operating piston means, for example as shown in said patent to A. Steinbart.

It will therefore be seen that in general my invention is applicable in connection with any fluid pressure regulator which may be controlled by float mechanism, and the invention may therefore be considered as comprising a novel method and apparatus for adjusting the float control means so as to effect the controlling operation thereof and thereby cause the same to so control the regulator as to maintain any desired pressure.

I claim:

1. In combination with a pressure regulator controlling device comprising two chambers having a body of liquid therein, said chambers being in communication beneath the surface of said body of liquid, float means operable to cause operation of said regulator upon displacement of the level of said body of liquid in one of said chambers from a definite equilibrium position, and means subjecting the liquid in said chambers to different pressures, whereby the operation of the regulator is dependent upon the difference between said pressures; means for adjusting said controlling device so as to vary the difference between said pressures required to maintain said float means in said equilibrium position, comprising an auxiliary chamber also in communication with said two chambers of the controlling device beneath the surface of the liquid therein means for varying the pressure upon the liquid therein, means for varying the pressure upon the liquid in said auxiliary chamber, and means remote from said controlling device but in communication with said auxiliary chamber above the level of the liquid therein and adapted to indicate the pressure upon the liquid in said auxiliary chamber.

2. In combination with a pressure regulator controlling device comprising two chambers having a body of liquid therein, said chambers being in communication beneath the surface of said body of liquid, float means operable to cause operation of said regulator upon displacement of the level of said body of liquid in one of said chambers from a definite equilibrium position, and means subjecting the liquid in said chambers to different pressures, whereby the operation of the regulator is dependent upon the difference between said pressures; means for adjusting said controlling device so as to vary the difference between said pressures required to maintain said float means in said equilibrium position, said adjusting means comprising an auxiliary chamber also in communication with said two chambers of the controlling device beneath the surface of the liquid therein, a source of pressure, means connecting said source of pressure to said auxiliary chamber, and valve means in said connecting means and remote from said controlling device and operable to alternatively establish communication between said auxiliary chamber and said source of pressure and between said auxiliary chamber and the atmosphere and also operable to place said auxiliary chamber out of communication with both said source of pressure and the atmosphere.

In testimony whereof I have hereunto subscribed my name this 16th day of March, 1925.

WALTER A. SCHMIDT.